(12) United States Patent
Chen et al.

(10) Patent No.: US 12,455,994 B2
(45) Date of Patent: Oct. 28, 2025

(54) INFORMATION PROCESSING SYSTEM, METHOD, APPARATUS AND STORAGE MEDIUM

(71) Applicants: Gongfu (Qingdao) Technology Co., Ltd., Shandong (CN); COSMO INSTITUTE OF INDUSTRIAL INTELLIGENCE (QINGDAO) CO., LTD., Shandong (CN); COSMO DIGITAL TECHNOLOGY (QINGDAO) CO., LTD., Shandong (CN)

(72) Inventors: Lucheng Chen, Shandong (CN); Xiangzhen Guan, Shandong (CN); Laichao Sun, Shandong (CN); Peicong Wang, Shandong (CN); Shousen Wang, Shandong (CN)

(73) Assignees: GONGFU (QINGDAO) TECHNOLOGY CO., LTD., Qingdao (CN); COSMO INSTITUTE OF INDUSTRIAL INTELLIGENCE (QINGDAO) CO., LTD., Qingdao (CN); COSMO DIGITAL TECHNOLOGY (QINGDAO) CO., LTD., Qingdao (CN)

(*) Notice: Subject to any disclaimer, the term of this patent is extended or adjusted under 35 U.S.C. 154(b) by 0 days.

(21) Appl. No.: 18/566,999

(22) PCT Filed: Sep. 7, 2022

(86) PCT No.: PCT/CN2022/117643
§ 371 (c)(1),
(2) Date: Dec. 4, 2023

(87) PCT Pub. No.: WO2023/134184
PCT Pub. Date: Jul. 20, 2023

(65) Prior Publication Data
US 2024/0273380 A1   Aug. 15, 2024

(30) Foreign Application Priority Data
Jan. 13, 2022   (CN) .................. 202210039186.6

(51) Int. Cl.
*G06F 30/27*   (2020.01)
*G06N 3/098*   (2023.01)

(52) U.S. Cl.
CPC ............ *G06F 30/27* (2020.01); *G06N 3/098* (2023.01)

(58) Field of Classification Search
None
See application file for complete search history.

(56) References Cited

U.S. PATENT DOCUMENTS 4,971,077 A * 11/1990 Dominguez ........... A24B 15/30
                                                       131/108
2005/0241656 A1* 11/2005 Kennison ............... A24D 1/002
                                                       131/274

FOREIGN PATENT DOCUMENTS

CN   111027165 A   4/2020
CN   113419857 A   9/2021
(Continued)

OTHER PUBLICATIONS

Sun, Wen, Shiyu Lei, Lu Wang, Zhiqiang Liu, and Yan Zhang. "Adaptive federated learning and digital twin for industrial internet of things." IEEE Transactions on Industrial Informatics 17, No. 8 (2020): 5605-5614. (Year: 2020).*

(Continued)

*Primary Examiner* — Vincent Gonzales
(74) *Attorney, Agent, or Firm* — Davis Wright Tremaine LLP

(57) ABSTRACT

An information processing system, method, apparatus, device and a storage medium, where the system includes: a first data provider, a collaborator and second data providers, (Continued)

which participate in federated learning; the first data provider is used to generate and send a digital twin model to the collaborator; the digital twin model is used to reflect a relationship between a target result and a plurality of device running states that affect the target result; the collaborator is used to send the digital twin model to the second data providers, so that the second data providers train the digital twin model based on local data and receive corresponding model parameters; and aggregate the model parameters to obtain a global model, so that the second data providers can train on the basis of the digital twin model.

17 Claims, 4 Drawing Sheets

(56) References Cited

FOREIGN PATENT DOCUMENTS

| | | |
|---|---|---|
| CN | 113435121 A | 9/2021 |
| CN | 113435657 A | 9/2021 |
| CN | 113627085 A | 11/2021 |
| CN | 113792423 A | 12/2021 |
| CN | 114492179 A | 5/2022 |
| WO | 2021219053 A1 | 11/2021 |

OTHER PUBLICATIONS

Zhanjun, Yuan. "Modeling and simulation of cigarette weight control system." Open Cybernetics & Systemics Journal 8 (2014): 163-170. (Year: 2014).*

Zong, Xueyan, Yan Luan, Hongliang Wang, and Shu Li. "A multi-robot monitoring system based on digital twin." Procedia Computer Science 183 (2021): 94-99. (Year: 2021).*

Leng J, Yan D, Liu Q, Zhang H, Zhao G, Wei L, Zhang D, Yu A, Chen X. Digital twin-driven joint optimisation of packing and storage assignment in large-scale automated high-rise warehouse product-service system. International Journal of Computer Integrated Manufacturing. Aug. 3, 2021;34(7-8):783-800. (Year: 2021).*

The State Intellectual Property Office of People's Republic of China, "Notification to Grant Patent Right for Invention", in Application No. 202210039186.6, Jul. 2, 2024, 5 pages.

International Search Report issued in related International Application No. PCT/CN2022/117643, mailed on Oct. 26, 2022, in 12 pages.

* cited by examiner

INFORMATION PROCESSING SYSTEM, METHOD, APPARATUS AND STORAGE MEDIUM

CROSS-REFERENCE TO RELATED APPLICATIONS

This application is a National Stage of International Application No. PCT/CN2022/117643, filed on Sep. 7, 2022, which claims priority to Chinese Patent Application No. 202210039186.6, filed on Jan. 13, 2022. The aforementioned applications are hereby incorporated by reference in their entireties.

TECHNICAL FIELD

The present disclosure relates to the technical field of information processing and, in particular, to an information processing system, method, apparatus, device and a storage medium.

BACKGROUND

Federated machine learning (Federated machine learning), also known as federated learning (Federated Learning), can unite all parties for data usage and collaborative modeling on the premise that only local data is used, and has become a common method in privacy protection computing.

In an existing training method of federated learning, participants in training of the federated learning include a collaborator and data providers. In the training, the collaborator and the data providers jointly determine an initial model to be sent and train based on the local data of the data providers. However, when there are many data providers and the data volume of each data provider is large, there will be a problem of long training time.

Therefore, the prior art has a problem of not being able to obtain a trained global model in a short time and thus having a low efficiency.

SUMMARY

In order to solve the above problem in the prior art, that is, to solve the problem of not being able to obtain a trained global model in a short time and thus having a low efficiency, the present disclosure provides an information processing system, a method, an apparatus, a device and a storage medium where by setting a digital twin platform in a first data provider to simulate a running process of an entity target device in the first data provider, a digital twin model is obtained and then the obtained digital twin model is used to guide a second data provider, so that the second data provider can determine model parameters quickly and accurately, thereby improving the training efficiency of the global model.

In a first aspect, an embodiment of the present disclosure provides an information processing system, which includes a first data provider, a collaborator and a plurality of second data providers, which participate in federated learning;

the first data provider is used to generate and send a digital twin model to the collaborator; the digital twin model is obtained by simulating and testing a running process of an entity target device based on a digital twin platform; the digital twin platform is set in a first data provider; the digital twin model is used to reflect a relationship between a target result and a plurality of device running states that affect the target result;

the collaborator is used to receive the digital twin model sent by the first data provider, send the digital twin model to each second data provider, and receive model parameters uploaded by the second data providers; and aggregate the model parameters to obtain a global model; and the second data provider is used to receive the digital twin model sent by the collaborator, train the digital twin model according to respective local data to obtain model parameters, and send the model parameters to the collaborator.

In a second aspect, an embodiment of the present disclosure provides an information processing method, which is applied to a first data provider, where the method includes:

simulating and testing a running process of an entity target device based on a digital twin platform, and determining a digital twin model according to a predicted result; where the digital twin model is obtained by simulating and testing the running process of the entity target device based on the digital twin platform; the digital twin platform is set in a first data provider; and the digital twin model is used to reflect a relationship between a target result and a plurality of device running states that affect the target result; and sending the digital twin model to a collaborator, so that the collaborator can send the digital twin model to second data providers.

In a third aspect, an embodiment of the present disclosure provides an information processing method, which is applied to a collaborator, where the method includes:

receiving a digital twin model sent by a first data provider; where the digital twin model is obtained by simulating and testing a running process of an entity target device based on a digital twin platform; the digital twin platform is set in a first data provider; and the digital twin model is used to reflect a relationship between a target result and a plurality of device running states that affect the target result;

sending the digital twin model to second data providers, so that the second data providers can train the digital twin model based on local data to obtain model parameters; and receiving the model parameters uploaded by the second data providers, and aggregating the model parameters to obtain a global model.

In a fourth aspect, an embodiment of the present disclosure provides an information processing method, which is applied to second data providers, where the method includes:

receiving a digital twin model sent by a collaborator; where the digital twin model is obtained by simulating and testing a running process of an entity target device based on a digital twin platform; the digital twin platform is set in a first data provider; the digital twin model is used to reflect a relationship between a target result and a plurality of device running states that affect the target result;

training the digital twin model according to respective local data to obtain model parameters, and sending the model parameters to the collaborator; and repeating the above steps until a global model is obtained.

In a fifth aspect, an embodiment of the present disclosure provides an information processing apparatus, which is set in a first data provider, where the apparatus includes:

a predicting module, configured to simulate and test a running process of an entity target device based on a digital twin platform;

a determining module, configured to determine a digital twin model according to a predicted result; where the digital twin model is obtained by simulating and testing the running process of the entity target device based on the digital twin platform; the digital twin platform is set in a first data provider; the digital twin model is used to reflect a relationship between a target result and a plurality of device running states that affect the target result; and a sending module, configured to send the digital twin model to a collaborator, so that the collaborator can send the digital twin model to second data providers.

In a sixth aspect, an embodiment of the present disclosure provides an information processing apparatus, which is set in a collaborator, where the apparatus includes:

a receiving module, configured to receive a digital twin model sent by a first data provider; where the digital twin model is obtained by simulating and testing a running process of an entity target device based on a digital twin platform; the digital twin platform is set in the first data provider; and the digital twin model is used to reflect a relationship between a target result and a plurality of device running states that affect the target result;

a sending module, configured to send the digital twin model to second data providers, so that the second data providers can train the digital twin model based on local data to obtain model parameters; and a processing module, configured to receive the model parameters uploaded by the second data providers, and aggregate the model parameters to obtain a global model.

In a seventh aspect, an embodiment of the present disclosure provides an information processing apparatus, which is set in second data providers, where the apparatus includes:

a receiving module, configured to receive a digital twin model sent by a collaborator; where the digital twin model is obtained by simulating and testing a running process of an entity target device based on a digital twin platform; the digital twin platform is set in a first data provider; the digital twin model is used to reflect a relationship between a target result and a plurality of device running states that affect the target result; and a training module, configured to train the digital twin model according to respective local data to obtain model parameters, and send the model parameters to the collaborator.

In an eighth aspect, an embodiment of the present disclosure provides an information processing device, including: a memory and at least one processor;

the memory stores computer-executable instructions;

the at least one processor executes the computer-executable instructions stored in the memory, so that the at least one processor executes the information processing method according to any one of the second, third and fourth aspects.

In a ninth aspect, an embodiment of the present disclosure provides a computer-readable storage medium in which computer-executable instructions are stored, and when the computer-executable instructions are executed by a processor, the information processing method according to any one of the second, third and fourth aspects is realized.

A person skilled in the art shall understand that, the information processing system, method, apparatus, device and storage medium provided by the embodiments of the present disclosure involve obtaining a digital twin model by setting a digital twin platform in a first data provider and simulating and testing a running process of an entity target device through the digital twin platform, where the digital twin model can reflect a relationship between a target result and a plurality of device running states that affect the target result; sending the digital twin model to a collaborator, so that the collaborator can send the digital twin model to second data providers, and thus the second data providers can train the model using local data to obtain model parameters.

BRIEF DESCRIPTION OF DRAWINGS

Implementations of an information processing system, method, apparatus and device of the present disclosure will be described below with reference to the accompanying drawings. The accompanying drawings, which are incorporated in and constitute a part of this specification, illustrate embodiments consistent with the present disclosure and serve to, together with the specification, explain the principles of the present disclosure. The accompanying drawings are.

DESCRIPTION OF EMBODIMENTS

In order to make the purpose, technical solution and advantages of the present disclosure more clear, the technical solutions in the embodiments of the disclosure will be described clearly and completely in the following. Apparently, the described embodiments are merely part rather than all of the embodiments of the present disclosure. Other embodiments obtained by a person of ordinary skill in the art based on the embodiments of the present disclosure without creative efforts shall belong to the protection scope of the present disclosure.

The technical solution of the present disclosure and how the technical solution of the present disclosure solves the above technical problems will be described in detail with reference to specific embodiments. The following specific embodiments can be combined with each other, and the same or similar concepts or processes may not be repeated in some embodiments. The embodiments of the present disclosure will be described below with reference to the accompanying drawings.

Figure 1:
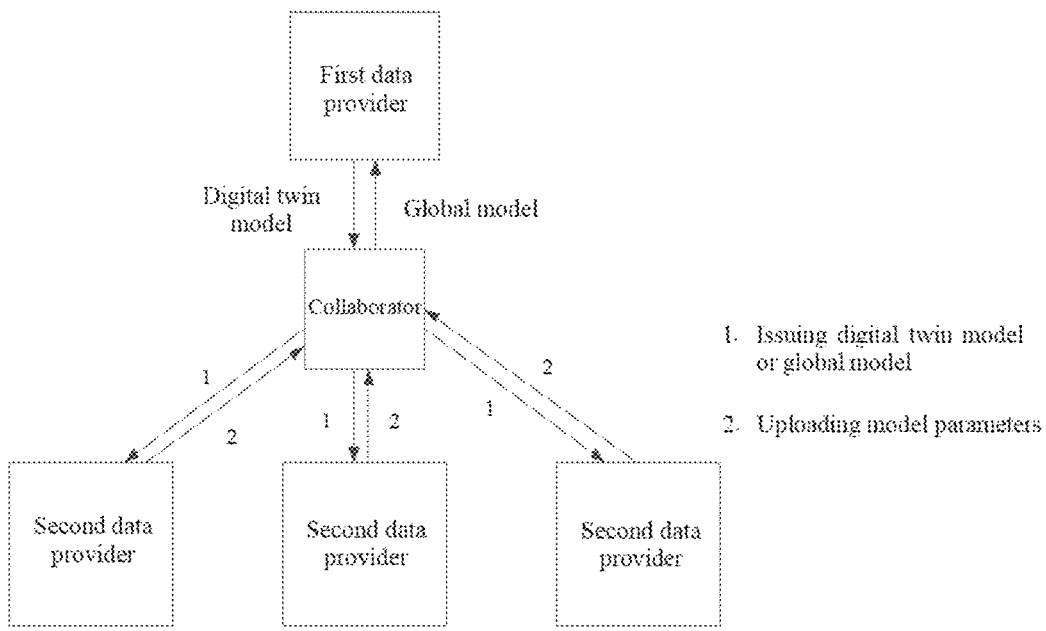
FIG. 1 is a schematic structural diagram of an information processing system provided by an embodiment of the present disclosure.

The disclosure scenario of the embodiments of the present disclosure is explained below:

FIG. 1 is a schematic structural diagram of an information processing system provided by an embodiment of the present disclosure. As shown in FIG. 1, the information processing system includes a first data provider, a collaborator and a plurality of second data providers. Among them, the first data provider and the second data providers can be multiple organizations, which can be cigarette factories located in various regions. For example, the first data provider is a cigarette factory located in region A, and the second data providers are cigarette factories located in region B, region C and region D respectively. For cigarette factories in different regions, their cigarette devices are the same. When different device running states are set for the cigarette devices, weight stability of produced cigarettes also varies. In order to study the effect of the device running states on cigarette weight stability, each data provider uses local data to train the model through a federated learning method, and then the model training can be completed under the condition of ensuring that the data does not go out of local data, so that cigarette factories in various regions can control the running of cigarette devices based on the trained global model.

When training each data provider through federated machine learning, if there are many data providers and the data volume of local data corresponding to each data provider is large, there will be a problem of long training time.

In view of the above problems, it is considered that each data provider cannot determine the training standard when training the model, which makes the training time long. Based on this, a digital twin platform is set in a data provider (first data provider), to simulate a running process of an entity target device (cigarette device), so as to obtain a digital twin model, which can reflect a relationship between a target result and a plurality of device running states that affect the target result, and then the digital twin model is sent to the collaborator, so that the collaborator can send the digital twin model to each second data provider. Therefore, each second data provider can train on the basis of the digital twin model instead of a randomly set initial model when performing model training, thereby improving the efficiency of determining the global model.

FIG. 1 is a schematic structural diagram of an information processing system provided by an embodiment of the present disclosure. As shown in FIG. 1, the system includes a first data provider, a collaborator and a plurality of second data providers, which participate in the federated learning;
 the first data provider is used to generate and send a digital twin model to the collaborator; the digital twin model is obtained by simulating and testing a running process of an entity target device based on a digital twin platform; the digital twin platform is set in the first data provider; the digital twin model is used to reflect a relationship between a target result and a plurality of device running states that affect the target result;
 the collaborator is used to receive the digital twin model sent by the first data provider, send the digital twin model to individual second data providers, and receive model parameters uploaded by individual second data providers; and aggregate the model parameters to obtain a global model;
 the second data providers are used to receive the digital twin model sent by the collaborator, train the digital twin model according to respective local data to obtain model parameters, and send the model parameters to the collaborator.

The information processing system includes a plurality of data providers and a collaborator. The first data provider is provided with a digital twin platform, which can simulate and test the running process of the target device to obtain the digital twin model. No digital twin platform is set in the second data providers. Taking the running process of the above cigarette device as an example, the first data provider can be Qingdao Cigarette Factory, and the digital twin platform can simulate the running processes of the cigarette device under different running states in the cigarette factory, so as to obtain the cigarette weight stability corresponding to different running states, that is, the target result. For example, the running states of the device that affect the cigarette weight stability include parameters such as needle roller speed, VE (Vibro Equipment) suction chamber negative pressure, small fan positive pressure and baffle height. The plurality of device running states can be set to different values respectively, and the corresponding cigarette weight stability can be obtained. After processing by the first data provider, a digital twin model can be obtained based on the simulated data, and the digital twin model can reflect a plurality of device running states that have large influence on the target result and desired set values of the plurality of device running states.

Among them, after the first data provider obtains the digital twin model, the obtained digital twin model can be sent to the collaborator, and the collaborator is used to send the digital twin model to individual second data providers, and individual second data providers store their own local data. For example, the individual second data providers are Qingzhou Cigarette Factory, Jinan Cigarette Factory, etc., and the local data stored in the second data providers are real numerical values of the device running states and corresponding cigarette weight stability. According to the local data, the digital twin model can be trained to get model parameters. Among them, the model parameters refer to desired set values of modified device running states obtained based on their respective local data and corresponding target results. For example, the digital twin model indicates that when a needle roller speed is 1000 rpm, the cigarette weight stability is 95%, which is a good effect; after training based on local data of a certain second data provider, when the modified needle roller speed is 1100 rpm, the cigarette weight stability is 98%, which is a good effect. Where, a training process is that when each second data provider, upon learning that the cigarette weight stability can reach a good value when the needle roller speed indicated by the digital twin model is 1000 rpm, will set the needle roller speed about 1000 rpm, such as 1100 rpm, 900 rpm and the like, so as to quickly obtain a modified model parameter.

Where since the digital twin model has determined a reference value of the each device running state, each second data provider can adjust on the basis of the reference value when training the model. The digital twin model provides a training direction for each second data provider when training, and thus a modified model parameter can be obtained quickly.

Where after the collaborator gets the model parameters uploaded by the second data providers, it can aggregate the model parameters to obtain a global model, where each device running state in the global model is determined by synthesizing the model parameters provided by the second data providers, and each device running state set in the global model may not be optimal for the first data provider and each second data provider, but it is an optimal setting mode for the whole.

The global model is determined through model sending and training processes between the collaborator, each second data provider and the first data provider, and the model training process is ended when the global model converges.

The information processing system provided by the embodiments of the present disclosure includes a first data provider, a collaborator and a plurality of second data providers, participating in federated learning; the first data provider is used to generate and send a digital twin model to the collaborator; the digital twin model is obtained by simulating and testing a running process of an entity target device based on a digital twin platform; the digital twin platform is set in the first data provider; the digital twin model is used to reflect a relationship between a target result and a plurality of device running states that affect the target result; the collaborator is used to receive the digital twin model sent by the first data provider, send the digital twin model to each second data provider, and receive model parameters uploaded by the second data providers; aggregate the model parameters to obtain a global model; the second data providers are used to receive the digital twin model sent by the collaborator, train the digital twin model according to respective local data to obtain the model parameters, and send the model parameters to the collaborator. By setting a digital twin platform in the first data provider and obtaining the digital twin model, the training process of each second data provider can be guided based on the model, so that each second data provider can quickly and accurately obtain a model parameter during training, thereby quickly obtaining the global model and improving the training efficiency of the model.

Figure 2:
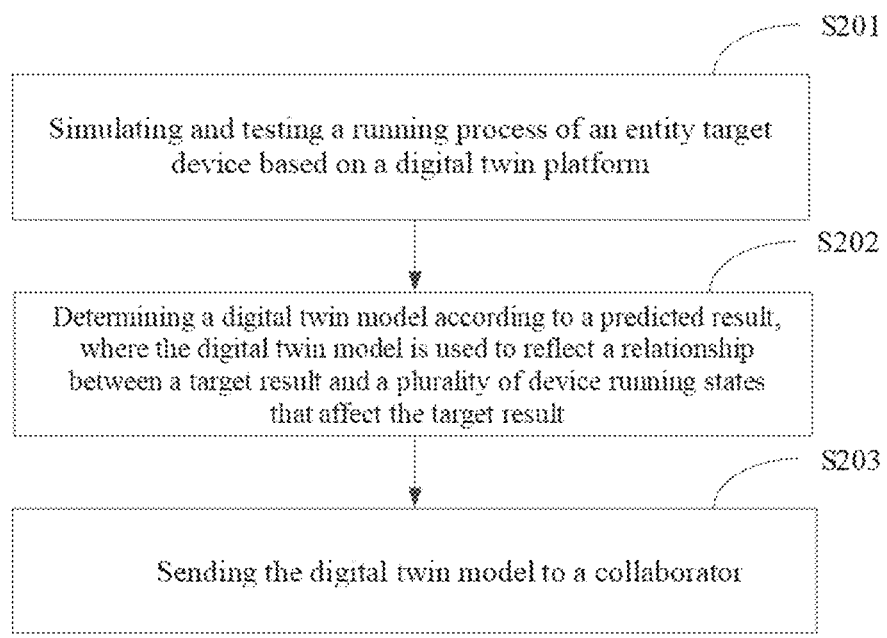
FIG. 2 is a schematic flowchart of an information processing method provided by an embodiment of the present disclosure.

FIG. 2 is a schematic flowchart of an information processing method provided by an embodiment of the present disclosure. As shown in FIG. 2, the method is applied to a first data provider, and the method includes:

S201: simulating and testing a running process of an entity target device based on a digital twin platform;

S202: determining a digital twin model according to a predicted result, where the digital twin model is obtained by simulating and testing the running process of the entity target device based on the digital twin platform; the digital twin platform is set in a first data provider; the digital twin model is used to reflect a relationship between a target result and a plurality of device running states that affect the target result;

S203: sending the digital twin model to a collaborator.

Where the digital twin platform is set in the first data provider, and the digital twin platform can simulate and test the running process of the entity target device. For example, cigarette weight stability in each device running state of a cigarette device is simulated, so as to obtain a digital twin model. The digital twin model is setting an optimal value of the device running state for a first data provider. The obtained digital twin model will be sent to a collaborator. Since cigarette devices used in second data providers are the same as the cigarette device in the first data provider, the digital twin model can be used to guide a model training process of each second data provider. Therefore, the digital twin model is sent to the collaborator, so that the collaborator can send it to the second data providers.

In an implementation, the entity target device is a cigarette machine; the device running state includes at least one of needle roller speed, VE suction chamber negative pressure, small fan positive pressure and baffle height, device running time and failure rate; the target result is cigarette weight stability.

For the process of cigarette production, the entity target device is a cigarette machine, and the target result is cigarette weight stability. The device running state that affects cigarette weight stability includes at least one of needle roller speed, VE suction chamber negative pressure, small fan positive pressure and baffle height, device running time and failure rate. Therefore, the digital twin model can be obtained by simulating a working process of the cigarette machine. In the simulation process, each device running state can be set to different values so as to obtain the corresponding cigarette weight stability.

A process of generating the digital twin model is described in detail below.

In an implementation, the simulating and testing the running process of the entity target device based on the digital twin platform and determining the digital twin model according to the predicted result includes:

generating a control instruction to change all current device running states affecting the target result;

simulating the running process of the entity target device in a three-dimensional model according to the control instruction, and obtaining a predicted result corresponding to the control instruction, where the three-dimensional model is established based on the entity target device;

obtaining the digital twin model based on a deep learning algorithm according to all current device running states and the corresponding predicted result.

Where when generating the digital twin model, the control instruction of changing all current device running states affecting the target result can be generated, for example, instruction for parameters including such as needle roller speed, VE suction chamber negative pressure, small fan positive pressure and baffle height. Based on the instruction, the three-dimensional model can simulate the running process of the entity target device. The three-dimensional model is a virtual model corresponding to the entity target device, and can simulate the predicted result of the entity target device under the corresponding control instruction. Finally, the digital twin model can be obtained based on the deep learning algorithm, for example, the digital twin model is obtained using an automatic learning process of the deep learning algorithm by taking the control instruction as the input of the deep learning algorithm, and taking the predicted result as an output of the deep learning algorithm.

The above-mentioned process of determining the digital twin model has the advantages of being simple and fast, and can simulate the operation of the entity target device, so as to obtain the device running state that affects the target result.

Figure 3:
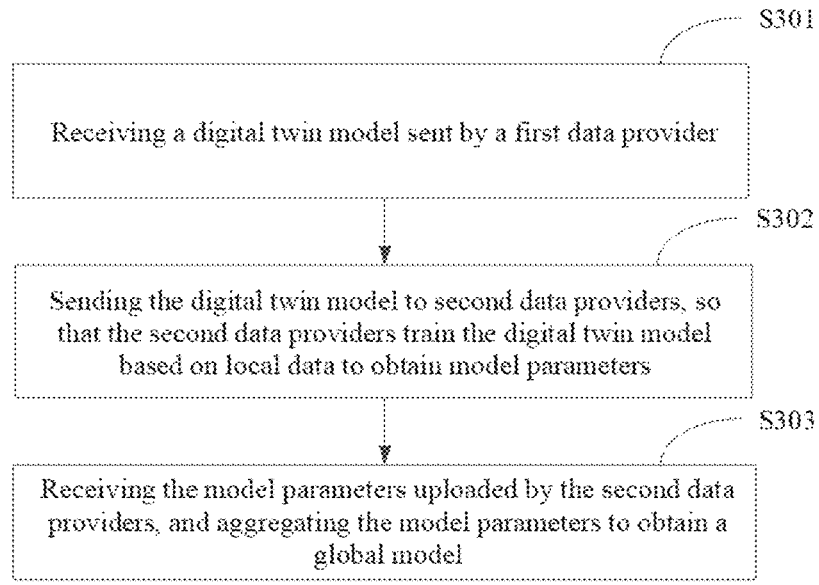
FIG. 3 is a schematic flowchart of another information processing method provided by an embodiment of the present disclosure.

FIG. 3 is a schematic flowchart of another information processing method provided by an embodiment of the present disclosure. As shown in FIG. 3, the present disclosure further provides an information processing method, applied to a collaborator, and the method includes:

S301: receiving a digital twin model sent by a first data provider, where the digital twin model is obtained by simulating and testing a running process of an entity target device based on a digital twin platform; the digital twin platform is set in the first data provider; the digital twin model is used to reflect a relationship between a target result and a plurality of device running states that affect the target result;

S302: sending the digital twin model to second data providers, so that the second data providers can train the digital twin model using local data to obtain model parameters;

S303: receiving the model parameters uploaded by the second data providers, and aggregating the model parameters to obtain a global model.

Where a collaborator can receive the digital twin model sent by the first data provider and send it to the second data providers, and the second data providers store the historical data of device running, i.e., local data.

Where when the digital twin model is issued, it can be encrypted by an encryption algorithm, and the second data providers can decrypt the digital twin model by using a stored public key after obtaining the digital twin model. In addition, the collaborator can also send preset training times.

After receiving the digital twin model, the second data providers can use the local data to train the digital twin model to obtain the model parameters, encrypt the model parameters and send them to the collaborator.

After receiving the model parameters sent by the second data providers, the collaborator can aggregate the model parameters to obtain the global model.

In an implementation, the sending the digital twin model to the second data providers includes:

sending the digital twin model and a device running state to be calibrated this time to the second data providers, so that the second data providers can train the device running state to be calibrated this time in the digital twin model by using local data to obtain model parameter;

correspondingly, the receiving the model parameters uploaded by the second data providers includes:

receiving a modified value of the device running state to be calibrated this time sent by the second data providers, and corresponding cigarette weight stability when the device running state is the modified value;

correspondingly, the aggregating the model parameters to obtain the global model includes:

determining an updated model parameter according to the modified value and the corresponding cigarette weight stability for device running state to be calibrated each time, where the updated model parameter is a target value of each device running state.

Where since there are multiple device running states that affect the operation of the target device, each time the model is trained, only a few of device running states can be trained and determined as the device running state to be calibrated this time. The second data providers can train only the device running state to be calibrated this time by using local data to obtain the model parameters corresponding to the device running state to be calibrated this time. For example, when training the model for the first time, two parameters, namely, the needle roller speed and the VE suction chamber negative pressure, can be calibrated, that is, modifying the two parameters to obtain the cigarette weight stability, so as to get an optimal modified value corresponding to the device running state to be calibrated this time.

Correspondingly, the collaborator can also receive the modified values of the calibrated device running states this time and the corresponding cigarette weight stability sent by the second data providers. The updated model parameter is obtained by aggregating the modified values of the device running states and the corresponding cigarette weight stability sent by the second data providers.

In an implementation, the determining updated model parameter according to the modified value and the corresponding cigarette weight stability includes:

multiplying the modified value and the corresponding cigarette weight stability for each-time device running state to be calibrated, and adding the multiplied result corresponding to each second data provider and the multiplied result corresponding to the first data provider to obtain an added result;

multiplying the added result by a preset coefficient, and determining the obtained multiplied result as the model parameter corresponding to the device running state to be calibrated in the global model to obtain the updated model parameter.

Where in the process of aggregation, the modified value sent by each second data provider and the corresponding cigarette weight stability can be weighted and summed to obtain the updated model parameter. Specifically, for each device running state to be calibrated, such as needle roller speed, the modified values of the needle roller speed sent by the second data providers can be multiplied by the corresponding cigarette weight stability to obtain multiple multiplied results, and the multiplied results are summed, and then the summed result is multiplied by a preset coefficient to obtain the updated model parameter corresponding to the device running state to be calibrated. Where a specific set value of the preset coefficient is not limited here, and may be the number of the second data providers. Alternatively, a weighting coefficient can be set for each multiplied result, a product of the weighting coefficient and the multiplied result is obtained, and then the products are summed to be determined as the updated model parameter corresponding to the device running state to be calibrated.

In an implementation, the method further includes:

sending the updated model parameter to the first data provider and the second data providers, and repeatedly performing the process of the first data provider and the second data providers using their respective local data to train the digital twin model to obtain the model parameter, receiving the model parameters uploaded by the first data provider and the second data providers, and aggregating the model parameters to obtain the global model until it is determined that the global model converges;

when the global model converges, determining the device running state to be calibrated next time until the plurality of device running states are calibrated.

Where after the collaborator obtains the updated model parameter corresponding to the device running state to be calibrated this time, the model parameter can be issued to each second data provider and the first data provider again, so that each second data provider and the first data provider can train the digital twin model again based on the local data, and obtain the model parameter uploaded by each data provider again and perform aggregation processing; and the above issuing and aggregation processing of the model are repeated until the global model converges. When the global model converges at this time, it means that the device running state to be calibrated this time has been calibrated. A device running state to be calibrated next time can be set, and the above processes can be repeated in sequence until all the device running states have been calibrated, thereby obtaining the final global model.

Where when determining the convergence of the global model, it can be determining that the training times reach the preset training times, or the target result corresponding to the first data provider or the second data providers reaches a preset result.

Figure 4:
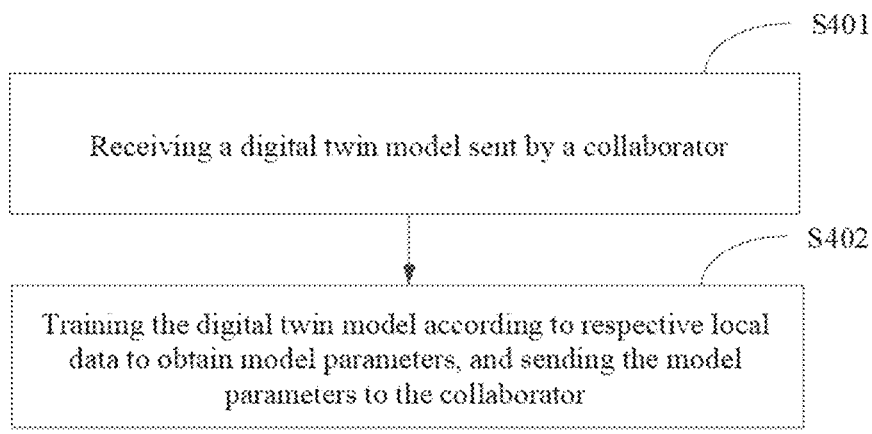
FIG. 4 is a schematic flowchart of yet another information processing method provided by an embodiment of the present disclosure.

As shown in FIG. 4, an embodiment of the present disclosure further provides an information processing method, which is applied to second data providers, where the method includes:

S401: receiving a digital twin model sent by a collaborator, where the digital twin model is obtained by simulating and testing a running process of an entity target device based on a digital twin platform; the digital twin platform is set in a first data provider; the digital twin model is used to reflect a relationship between a target result and a plurality of device running states that affect the target result;

S402: training the digital twin model according to respective local data to obtain model parameters, and sending the model parameters to the collaborator;

repeating the above steps until a global model is obtained.

For the second data providers, they each store different local data, and the entity target device may set different values for the device running state in an actual running process. The training model can be trained based on the local data, so that the global model can meet the needs of various regions for the setting of the device running state.

By receiving the digital twin model generated based on the digital twin platform in the first data provider and issued by the collaborator, the second data providers can be guided to better train the model. Variations can be made around desired set values of the device running states provided by the digital twin model, thereby making the training process faster.

Figure 5:
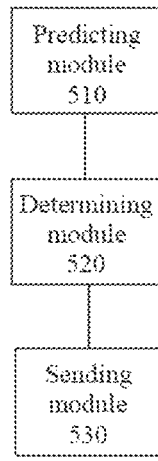
FIG. 5 is a schematic structural diagram of an information processing apparatus provided by an embodiment of the present disclosure.

FIG. 5 is a schematic diagram of an information processing apparatus 50 provided by an embodiment of the present disclosure, where the apparatus is set in a first data provider. As shown in FIG. 5, the apparatus includes:

a predicting module 510, configured to simulate and test a running process of an entity target device based on a digital twin platform;

a determining module 520, configured to determine a digital twin model according to a predicted result, where the digital twin model is obtained by simulating and testing the running process of the entity target device based on the digital twin platform; the digital twin platform is set in the first data provider; the digital twin model is used to reflect a relationship between a target result and a plurality of device running states that affect the target result;

a sending module 530, configured to send the digital twin model to a collaborator.

In an implementation, the determining module 520 is specifically configured to:

generate a control instruction to change all current device running states of affecting the target result;

simulate the running process of the entity target device in a three-dimensional model according to the control instruction, and obtain the predicted result corresponding to the control instruction; where the three-dimensional model is established based on the entity target device;

obtain the digital twin model based on a deep learning algorithm according to all current device running states and corresponding predicted results.

In an implementation, the entity target device is a cigarette machine; the device running state includes at least one of needle roller speed, VE suction chamber negative pressure, small fan positive pressure and baffle height, device running time and failure rate; the target result is cigarette weight stability.

The information processing apparatus provided by an embodiment of the present disclosure can execute the information processing method of the present disclosure applied to a first data provider, and has functional modules and beneficial effects corresponding to execution of the method.

Figure 6:
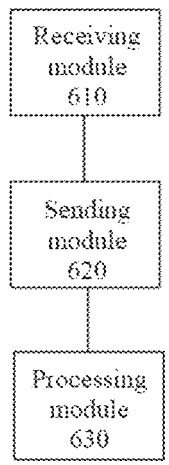
FIG. 6 is a schematic structural diagram of another information processing apparatus provided by an embodiment of the present disclosure.

FIG. 6 is a schematic structural diagram of an information processing apparatus 60 provided by an embodiment of the present disclosure, where the apparatus is set in a collaborator. As shown in FIG. 6, the apparatus includes:

a receiving module 610, configured to receive a digital twin model sent by the first data provider; where the digital twin model is obtained by simulating and testing a running process of an entity target device based on a digital twin platform; the digital twin platform is set in the first data provider; the digital twin model is used to reflect a relationship between a target result and a plurality of device running states that affect the target result;

a sending module 620, configured to send the digital twin model to the second data providers, so that the second data providers can train the digital twin model using local data to obtain model parameters;

a processing module 630, configured to receive the model parameters uploaded by the second data providers, and aggregate the model parameters to obtain a global model.

In an implementation, the sending module 620 is specifically configured to:

send the digital twin model and a device running state to be calibrated this time to the second data providers, so that the second data providers can train the device running state to be calibrated this time in the digital twin model by using local data to obtain the model parameters;

correspondingly, the receiving module 610 is specifically configured to:

receive a modified value of the device running state to be calibrated this time sent by the second data providers, and corresponding cigarette weight stability when the device running state is the modified value;

correspondingly, the processing module 630 is specifically configured to:

determine an updated model parameter according to the modified value and the corresponding cigarette weight stability for device running state to be calibrated each time; the updated model parameter is a target value of the device running states.

In an implementation, the processing module 630 is specifically configured to:

multiply the modified value and the corresponding cigarette weight stability for the device running state to be calibrated each time, and adding a multiplied result corresponding to each second data provider and a multiplied result corresponding to the first data provider to obtain an added result;

multiply the added result by a preset coefficient, and determine the obtained multiplied result as a model parameter corresponding to the device running state to be calibrated in the global model to obtain the updated model parameter.

In an implementation, the sending module 620 is further configured to: send the updated model parameter to the first data provider and the second data providers, and repeatedly execute that the first data provider and the second data providers use their respective local data to train the digital twin model to obtain the model parameters;

the receiving module 610 is further configured to receive the model parameters uploaded by the first data provider and the second data providers, and aggregate the model parameters to obtain a global model until it is determined that the global model converges;

the apparatus further includes a determining module, which is used to determine a device running state to be calibrated next time after the global model converges until the plurality of device running states are all calibrated.

The information processing apparatus provided by the embodiment of the present disclosure can execute the information processing method of the present disclosure applied to a collaborator, and has functional modules and beneficial effects corresponding to execution of the method.

Figure 7:
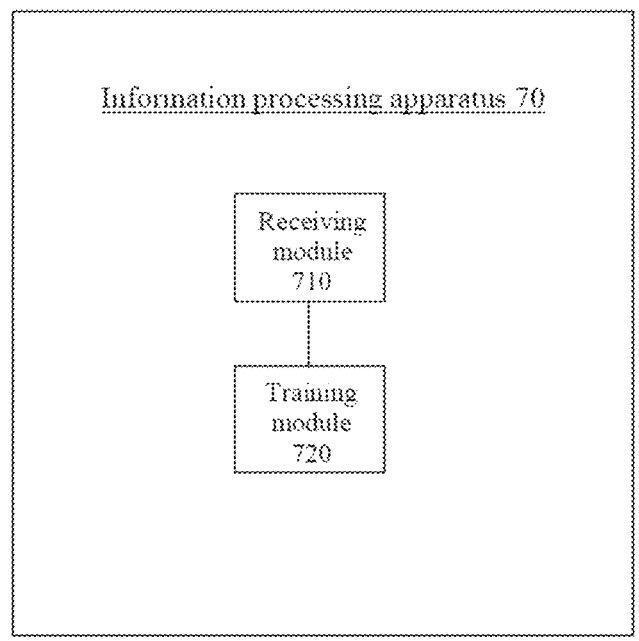
FIG. 7 is a schematic structural diagram of yet another information processing apparatus provided by an embodiment of the present disclosure.

FIG. 7 is a schematic structural diagram of an information processing apparatus 70 provided by an embodiment of the present disclosure, where the apparatus is set in second data providers. As shown in FIG. 7, the apparatus includes:

a receiving module 710, configured to receive a digital twin model sent by a collaborator, where the digital twin model is obtained by simulating and testing a running process of an entity target device based on a digital twin platform; the digital twin platform is set in the first data provider; the digital twin model is used to reflect a relationship between a target result and a plurality of device running states that affect the target result;

a training module 720, configured to train the digital twin model according to respective local data to obtain model parameters, and send the model parameters to the collaborator.

The information processing apparatus provided by the embodiment of the present disclosure can execute the information processing method applied to the second data providers, and has functional modules and beneficial effects corresponding to execution of the method.

Figure 8:
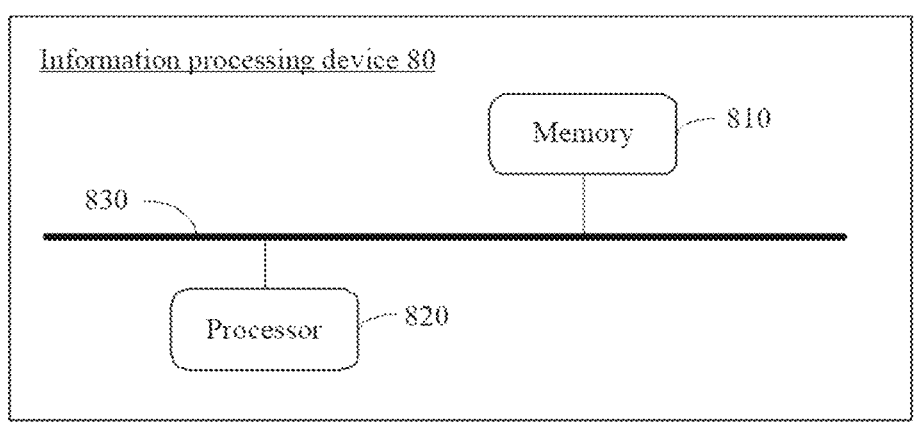
FIG. 8 is a schematic structural diagram of an information processing device provided by an embodiment of the present disclosure.

FIG. 8 is a schematic structural diagram of an information processing device 80 provided by an embodiment of the present disclosure. As shown in FIG. 8, the information processing device 80 includes a memory 810 and at least one processor 820.

The memory 810 stores computer-executable instructions;

the at least one processor 820 executes the computer-executable instructions stored in the memory 810, so that the at least one processor 820 executes them to realize the present disclosure.

Where the memory 810 and the processor 820 are connected by a bus 830.

Related descriptions can be understood by referring to the related description and effects corresponding to the steps in FIGS. 1-4, and will not be described here again.

The present disclosure also provides a readable storage medium, where the readable storage medium stores executable instructions, and when at least one processor of a server executes the executable instructions, the information processing methods in the foregoing embodiment are realized.

The present disclosure also provides a program product, where the program product includes executable instructions, and the executable instructions are stored in a readable storage medium. At least one processor of the information processing device can read the executable instructions from the readable storage medium, and the at least one processor executes the executable instructions, causing the information processing device to implement the information processing methods provided in the foregoing various embodiments.

In the embodiments provided by the present disclosure, it should be understood that the disclosed apparatuses and methods may be realized in other ways. For example, the apparatus embodiments described above are only schematic, for example, the division of the modules is merely logical function division, and in actual implementation, there may be other division methods, such as multiple modules or components can be combined or integrated into another system, or some features can be ignored or not implemented. On the other hand, the mutual coupling or direct coupling or communication connection shown or discussed can be indirect coupling or communication connection through some interfaces, apparatuses or modules, and can be electrical, mechanical or other forms.

The modules described as separate components may or may not be physically separated, and the components displayed as modules may or may not be physical modules, that is, they may be located in one place or issued to multiple network modules. Some or all of the modules therein can be selected according to actual needs to achieve the purpose of the embodiments.

In addition, the functional modules in the embodiments of the present disclosure can be integrated into one processing module, or the modules can exist physically alone, or two or more modules can be integrated into one module. The above-mentioned integrated modules can be realized in the form of hardware, or in the form of hardware plus software functional modules.

The above-mentioned integrated modules realized in the form of software functional modules can be stored in a computer-readable storage medium. The above software functional modules are stored in a storage medium, which includes several instructions for causing a computer device (which may be a personal computer, a server, a network device, etc.) or a processor to execute some of the steps of the methods in various embodiments of the present disclosure. The foregoing storage medium includes: a USB disk, a mobile hard disk, a read-only memory (ROM), a random access memory (RAM), a magnetic disk, an optical disk and other medium that can store program codes.

Finally, it should be explained that the above embodiments are only used to illustrate the technical solutions of the disclosure, but not to limit them; although the present disclosure has been described in detail with reference to the foregoing embodiments, it should be understood by a person skilled in the art that the scope of the present disclosure is obviously not limited to these specific embodiments. Under the premise of not deviating from the principle of the present disclosure, a person skilled in the art can make equivalent changes or substitutions on relevant technical features, and the technical solutions after these changes or substitutions will fall within the scope of the present disclosure.

The invention claimed is:

1. An information processing system, wherein the system comprises: a processor, a first data provider, a collaborator and a plurality of second data providers, which participate in federated learning, wherein:

the first data provider is used to generate and send a digital twin model to the collaborator; the digital twin model is obtained by simulating and testing a running process of an entity target device based on a digital twin platform; the digital twin platform is set in the first data provider; the digital twin model is used to reflect a relationship between a target result and a plurality of device running states that affect the target result;

the collaborator is used to receive the digital twin model sent by the first data provider, send the digital twin model to the second data providers, and receive model parameters uploaded by the second data providers; and aggregate the model parameters to obtain a global model, so that the first data provider and the second data providers control the running of devices based on the trained global model;

the second data providers are used to receive the digital twin model sent by the collaborator, train the digital twin model according to respective local data to obtain the model parameters, and send the model parameters to the collaborator;

wherein the sending the digital twin model to the second data providers comprises:

sending the digital twin model and a device running state to be calibrated this time to the second data providers, so that the second data providers train the device running state to be calibrated this time in the digital twin model by using local data to obtain the model parameters;

correspondingly, the receiving the model parameters sent by the second data providers respectively comprises:

receiving a modified value of the device running state to be calibrated this time sent by the second data providers, and corresponding cigarette weight when the device running state is the modified value;

correspondingly, the aggregating the model parameters to obtain the global model comprises:

determining an updated model parameter according to the modified value and corresponding cigarette weight for each device running state to be calibrated this time, wherein the updated model parameter is a target value of the device running states;

wherein the determining the updated model parameter according to the modified value and the corresponding cigarette weight comprises:

multiplying the modified value and the corresponding cigarette weight for the device running state to be calibrated each time, and adding a multiplied result corresponding to each second data provider and a multiplied result corresponding to the first data provider to obtain an added result;

multiplying the added result by a preset coefficient, and determining an obtained multiplied result as a model parameter corresponding to the device running state to be calibrated in the global model to obtain the updated model parameter.

2. An information processing method applied to a first data provider, executed by the processor, wherein the method comprises:

simulating and predicting a running process of an entity target device based on a digital twin platform, and determining a digital twin model according to a predicted result, wherein the digital twin model is obtained by simulating and testing the running process of the entity target device based on the digital twin platform; the digital twin platform is set in the first data provider; the digital twin model is used to reflect a relationship between a target result and a plurality of device running states that affect the target result;

sending the digital twin model to a collaborator, so that the collaborator sends the digital twin model to second data providers, and receive model parameters uploaded by the second data providers; and aggregate the model parameters to obtain a global model, so that the first data provider and the second data providers control the running of devices based on the trained global model;

wherein the sending the digital twin model to the second data providers comprises:

sending the digital twin model and a device running state to be calibrated this time to the second data providers, so that the second data providers train the device running state to be calibrated this time in the digital twin model by using local data to obtain the model parameters;

correspondingly, the receiving the model parameters sent by the second data providers respectively comprises:

receiving a modified value of the device running state to be calibrated this time sent by the second data providers, and corresponding cigarette weight when the device running state is the modified value;

correspondingly, the aggregating the model parameters to obtain the global model comprises:

determining an updated model parameter according to the modified value and corresponding cigarette weight for each device running state to be calibrated this time, wherein the updated model parameter is a target value of the device running states;

wherein the determining the updated model parameter according to the modified value and the corresponding cigarette weight comprises:

multiplying the modified value and the corresponding cigarette weight for the device running state to be calibrated each time, and adding a multiplied result corresponding to each second data provider and a multiplied result corresponding to the first data provider to obtain an added result;

multiplying the added result by a preset coefficient, and determining an obtained multiplied result as a model parameter corresponding to the device running state to be calibrated in the global model to obtain the updated model parameter.

3. The method according to claim 2, wherein the simulating and predicting the running process of the entity target device based on the digital twin platform and determining the digital twin model according to the predicted result comprise:

generating a control instruction to change all current device running states affecting the target result;

simulating the running process of the entity target device in a three-dimensional model according to the control instruction, and obtaining the predicted result corresponding to the control instruction; wherein the three-dimensional model is established based on the entity target device;

obtaining the digital twin model based on a deep learning algorithm according to the all current device running states and corresponding predicted results.

4. The method according to claim 3, wherein the entity target device is a cigarette machine; the device running state comprises at least one of needle roller speed, VE suction chamber negative pressure, small fan positive pressure and baffle height, device running time and failure rate; the target result is cigarette weight.

5. A non-transitory computer-readable storage medium, wherein the non-transitory computer-readable storage medium stores computer-executable instructions, which realize the information processing method according to claim 3 when executed by a processor.

6. The method according to claim 2, wherein the entity target device is a cigarette machine; the device running state comprises at least one of needle roller speed, VE suction chamber negative pressure, small fan positive pressure and baffle height, device running time and failure rate; the target result is cigarette weight.

7. An information processing device set in a first data provider, comprising: a memory and at least one processor, wherein:

the memory stores computer-executable instructions;

the at least one processor executes the computer-executable instructions stored in the memory, so that the at least one processor executes the information processing method according to claim 2.

8. The information processing device according to claim 7, wherein the at least one processor is further configured to:

generate a control instruction to change all current device running states affecting the target result;

simulate the running process of the entity target device in a three-dimensional model according to the control instruction, and obtain the predicted result corresponding to the control instruction; wherein the three-dimensional model is established based on the entity target device;

obtain the digital twin model based on a deep learning algorithm according to the all current device running states and corresponding predicted results.

9. The information processing device according to claim 8, wherein the entity target device is a cigarette machine; the device running state comprises at least one of needle roller speed, VE suction chamber negative pressure, small fan positive pressure and baffle height, device running time and failure rate; the target result is cigarette weight.

10. The information processing device according to claim 7, wherein the entity target device is a cigarette machine; the device running state comprises at least one of needle roller speed, VE suction chamber negative pressure, small fan positive pressure and baffle height, device running time and failure rate; the target result is cigarette weight.

11. An information processing method applied to a collaborator, executed by the processor, wherein the method comprises:

receiving a digital twin model sent by a first data provider, wherein the digital twin model is obtained by simulating and testing a running process of an entity target device based on a digital twin platform; the digital twin platform is set in the first data provider; the digital twin model is used to reflect a relationship between a target result and a plurality of device running states that affect the target result;

sending the digital twin model to second data providers, so that the second data providers train the digital twin model by using local data to obtain model parameters;

receiving the model parameters uploaded by the second data providers, and aggregating the model parameters to obtain a global model, so that the first data provider and the second data providers control the running of devices based on the trained global model;

wherein the sending the digital twin model to the second data providers comprises:

sending the digital twin model and a device running state to be calibrated this time to the second data providers, so that the second data providers train the device running state to be calibrated this time in the digital twin model by using local data to obtain the model parameters;

correspondingly, the receiving the model parameters sent by the second data providers respectively comprises:

receiving a modified value of the device running state to be calibrated this time sent by the second data providers, and corresponding cigarette weight when the device running state is the modified value;

correspondingly, the aggregating the model parameters to obtain the global model comprises:

determining an updated model parameter according to the modified value and corresponding cigarette weight for each device running state to be calibrated this time, wherein the updated model parameter is a target value of the device running states;

wherein the determining the updated model parameter according to the modified value and the corresponding cigarette weight comprises:

multiplying the modified value and the corresponding cigarette weight for the device running state to be calibrated each time, and adding a multiplied result corresponding to each second data provider and a multiplied result corresponding to the first data provider to obtain an added result;

multiplying the added result by a preset coefficient, and determining an obtained multiplied result as a model parameter corresponding to the device running state to be calibrated in the global model to obtain the updated model parameter.

12. The method according to claim 11, wherein the method further comprises:

sending the updated model parameter to the first data provider and the second data providers, and repeatedly performing a process of the first data provider and the second data providers using their respective local data to train the digital twin model to obtain the model parameters, receiving the model parameters uploaded by the first data provider and the second data providers, and aggregating the model parameters to obtain the global model, until it is determined that the global model converges;

when the global model converges, determining the device running state to be calibrated next time until the plurality of device running states are calibrated.

13. An information processing device set in a collaborator, comprising: a memory and at least one processor, wherein:

the memory stores computer-executable instructions;

the at least one processor executes the computer-executable instructions stored in the memory, so that the at least one processor executes the information processing method according to claim 11.

14. The information processing device according to claim 13, wherein the at least one processor is further configured to:

send the digital twin model and a device running state to be calibrated this time to the second data providers, so that the second data providers train the device running state to be calibrated this time in the digital twin model by using local data to obtain the model parameters;

correspondingly, the at least one processor is further configured to:

receive a modified value of the device running state to be calibrated this time sent by the second data providers, and corresponding cigarette weight when the device running state is the modified value;

correspondingly, the at least one processor is further configured to:

determine an updated model parameter according to the modified value and corresponding cigarette weight for each device running state to be calibrated this time, wherein the updated model parameter is a target value of the device running states.

15. The information processing device according to claim 14, wherein the at least one processor is further configured to:

multiply the modified value and the corresponding cigarette weight for the device running state to be calibrated each time, and add a multiplied result corresponding to each second data provider and a multiplied result corresponding to the first data provider to obtain an added result;

multiply the added result by a preset coefficient, and determine an obtained multiplied result as a model parameter corresponding to the device running state to be calibrated in the global model to obtain the updated model parameter.

16. The information processing device according to claim 15, wherein the at least one processor is further configured to:

send the updated model parameter to the first data provider and the second data providers, and repeatedly perform a process of the first data provider and the second data providers using their respective local data to train the digital twin model to obtain the model parameters, receive the model parameters uploaded by the first data provider and the second data providers, and aggregate the model parameters to obtain the global model, until it is determined that the global model converges;

when the global model converges, determine the device running state to be calibrated next time until the plurality of device running states are calibrated.

17. A non-transitory computer-readable storage medium, wherein the non-transitory computer-readable storage medium stores computer-executable instructions, which realize the information processing method according to claim 11 when executed by a processor.

* * * * *